United States Patent
Cray

[19]

[11] Patent Number: 5,930,201
[45] Date of Patent: Jul. 27, 1999

[54] ACOUSTIC VECTOR SENSING SONAR SYSTEM

[75] Inventor: Benjamin A. Cray, West Kingston, R.I.

[73] Assignee: The United States of America as represented by the Secretary of the Navy, Washington, D.C.

[21] Appl. No.: 09/013,465

[22] Filed: Jan. 27, 1998

[51] Int. Cl.$^6$ ....................................................... G01S 3/80
[52] U.S. Cl. ..................................................... 367/119
[58] Field of Search ...................................... 367/119, 129

[56] References Cited

PUBLICATIONS

Hawkes et al., "Bearing Estimation with Acoustic Vector–Sensor Arrays", AIP Conference Proceedings, No. 368, pp. 345–358, ISSN 0094–243X 1996.
D'Spain GL., "Relationship of Underwater Acoustic Intensity measurement to Beamforming", Canadian Acoustics, vol. 22, No. 3, pp. 157–158 Sep. 1994.

*Primary Examiner*—Ian J. Lobo
*Attorney, Agent, or Firm*—Michael J. McGowan; Prithvi C. Lall; James M. Kasischke

[57] ABSTRACT

A system for the detection of acoustic signals utilizing an array of acoustic sensors coupled to a beamformer which generates a steered acoustic beam using the output from one or more of the acoustic sensors within the array. The acoustic sensors include a multiaxis vector sensor co-located with a scalar acoustic pressure sensor. The beamformer generates a weighted output for each acoustic sensor by combining the weighted output of the scalar pressure sensor with the scalar field generated by forming the inner product of the vector components measured at each sensor location with a vector component weighting vector. The weighted output signals are delayed to synchronize the phase of the weighted output signal to that of a weighted signal at a reference array location. The resulting delayed weighted output signals are then summed.

3 Claims, 2 Drawing Sheets

ACOUSTIC VECTOR SENSING SONAR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the detection of acoustic signals. More specifically, the present invention relates to a sonar system which uses an array of acoustic vector sensors for detecting acoustic signals.

(2) Description of the Prior Art

The undersea operations of the Navy have shown a shift from deep water, open ocean environments to littoral, shallow water environments. These new environments often have high ambient noise levels and varying bottom conditions which reduce or impair the ability of existing sonar systems to detect, at a reasonable distance, all but low frequency acoustic signals. Thus, there is a need for an improved sonar system to detect acoustic signals in noisy, shallow water environments.

A fundamental measure of array performance is directivity. Increases in directivity can provide increased detection range and resolution. Conventional sonar systems use arrays of pressure sensors (hydrophones) to detect acoustic signals. For an array of pressure sensors, gains in directivity are fundamentally limited by the size of the array. Therefore, the only way to increase the directivity of an array of pressure sensors is to increase the size, or aperture, of the array.

In conventional submarine sonar arrays, the hydrophones are typically mounted to a steel conditioning plate or similar structure to enhance signal reception (pressure doubling). Increasing directivity by building a large aperture array would require heavy and unyielding signal conditioning plate. Creating a large aperture, low frequency array would require a relatively thick plate to create a rigid boundary condition. Such a large conditioning plate is unfeasible in many applications. Therefore, an improved sonar system, capable of detecting acoustic plane waves in noisy environments would be a welcome addition to the art.

SUMMARY OF THE INVENTION

Accordingly, it is a general purpose and object of the present invention to provide a sonar system which provides improved detection of acoustic signals in noisy environments.

Another object of the present invention is the provision of a sonar system having greater directivity than existing submarine sonar arrays.

A further object of the present invention is to provide a sonar system which uses an array of acoustic vector sensors for detecting acoustic signals.

These and other objects made apparent hereinafter are accomplished with the present invention by providing an array of acoustic vector sensors coupled to a beamformer. The beamformer generates steered acoustic beams using the output from one or more of the triaxial acoustic vector sensors. The beamformer weights the output signals from the sensors by forming the inner product of the velocity components measured at each element location with an element weighting vector, $\vec{w}_n^{(3)}$, delaying the resulting scalar field generated by weighting and then summing the delayed signals.

In a preferred embodiment, each element of the array comprises a triaxial velocity sensor co-located with an acoustic pressure sensor. The beamformer generates a weighted output signal for each velocity sensor by forming the inner product of the measured velocity components at each element location with a velocity weighting vector. The weighted output from each velocity sensor is combined with a weighted output from the respective acoustic pressure sensor to generate a weighted element output. The weighted element output signals are delayed to synchronize the phase of the weighted element output signals to that of a weighted signal at a reference array location. The resulting delayed weighted output signals are then summed.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
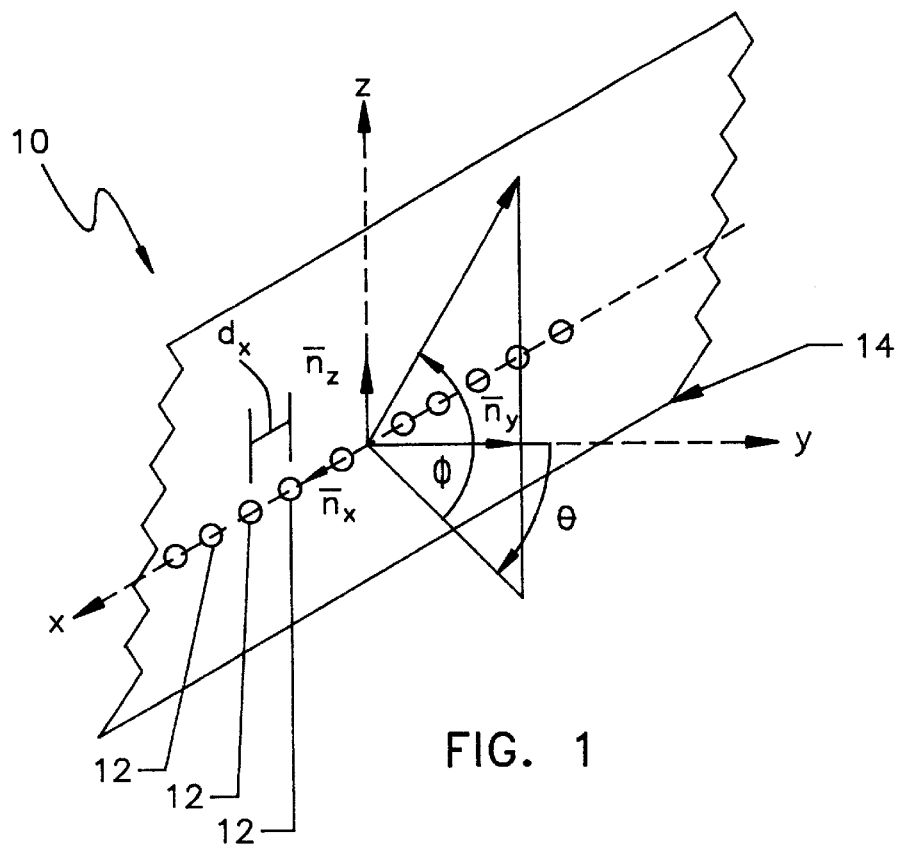
FIG. 1 illustrates the array coordinates and geometry for an equispaced line array of vector sensors.

Referring to FIG. 1, there is shown an equispaced line array 10 of multiaxis vector sensors 12 mounted on a baffle 14. The orientation of the coordinate system $\vec{x} = \{x,y,z\}$ and the mutually perpendicular unit vectors $\{\vec{n}_x, \vec{n}_y, \vec{n}_z\}$ is shown in FIG. 1 wherein the x-axis is aligned with the line array of multiaxis vector sensors 12 and the y-axis is normal to baffle 14 which coincides with the xz-plane. Thus, sensors 12 lie along the x-axis within the xz-plane and are bounded by a semi-infinite acoustic medium for y>0. In developing a model for the beamformed response of vector sensors, it will be assumed that baffle 14 provides an ideal boundary. That is, baffle 14 is entirely pressure release for each orthogonal acoustic velocity component. It is understood that for some applications such a baffle may not be realizable; however, such an assumption allows for the comparison of an array of vector sensor to an array of scalar pressure sensors based on ideal conditions.

Acoustic particle velocities are defined as small amplitude motions of constant volume fluid particles, each having unvarying fluid properties, about an equilibrium position. Time harmonic acoustic planewaves, which have wavefronts propagating in the direction of an acoustic wavevector $-\vec{k}$ (by convention the acoustic wavevector is defined to point from the origin to the source), can be characterized by acoustic particle velocity. With the orientation and geometry of FIG. 1, the vector components of the acoustic velocity are given by:

$$v_x(\vec{r},\omega)=V_x e^{i(\vec{k}\cdot\vec{r}+\omega t+\phi_x)} \quad (1)$$

$$v_y(\vec{r},\omega)=V_y e^{i(\vec{k}\cdot\vec{r}+\omega t+\phi_y)} \quad (2)$$

and $$v_z(\vec{r},\omega)=V_z e^{i(\vec{k}\cdot\vec{r}+\omega t+\phi_z)} \quad (3)$$

where $\|\vec{k}\|=\omega/c$ is the acoustic wavenumber, $\omega$ is the circular frequency, c is the sound speed, $\vec{r}=[x,y,z]$ is the position vector, and $V_x$, $V_y$, $V_z$ are the amplitudes of the component velocities in the x, y, z directions, respectively. The complete vector field may be written as:

$$\vec{v}^{(3)}(\vec{r},\omega) \times v_x(\vec{r},\omega)\vec{n}_x + v_y(\vec{r},\omega)\vec{n}_y + v_z(\vec{r},\omega)\vec{n}_z \quad (4)$$

where the superscript (3) denotes the dimension of the velocity vector with uniaxis vector sensors having a dimension of 1, biaxial sensors having a dimension of 2, and triaxial sensors having a dimension of 3. The elements of an uniaxis vector sensing array measure only one of the velocity components $v_x$, $v_y$, $v_z$ while multiaxis arrays measure two or more the vector components.

Each orthogonal component measured by vector sensor 12 has an amplitude response or element sensitivity which is proportional to the cosine of the angle between the planewave incidence arrival direction and the orthogonal component being measured. That is, for a triaxial vector sensor 12, the measured amplitude $V_x$ of velocity vector component $v_x$ is proportional to the cosine of the angle between the arrival direction of the planewave and the x-unit normal $\vec{n}_x$. Similarly, the amplitude $V_y$ of velocity component $v_y$ is proportional to the cosine of the angle between the arrival direction and the y-unit normal $\vec{n}_y$, and the amplitude $V_z$ of component $v_z$ is proportional to the cosine of the angle between the arrival direction and the z-unit normal $\vec{n}_z$. The cosine angular dependence for the amplitude response is derived from elementary solutions to the wave equation at the boundary of an ideal pressure release surface.

Figure 2:
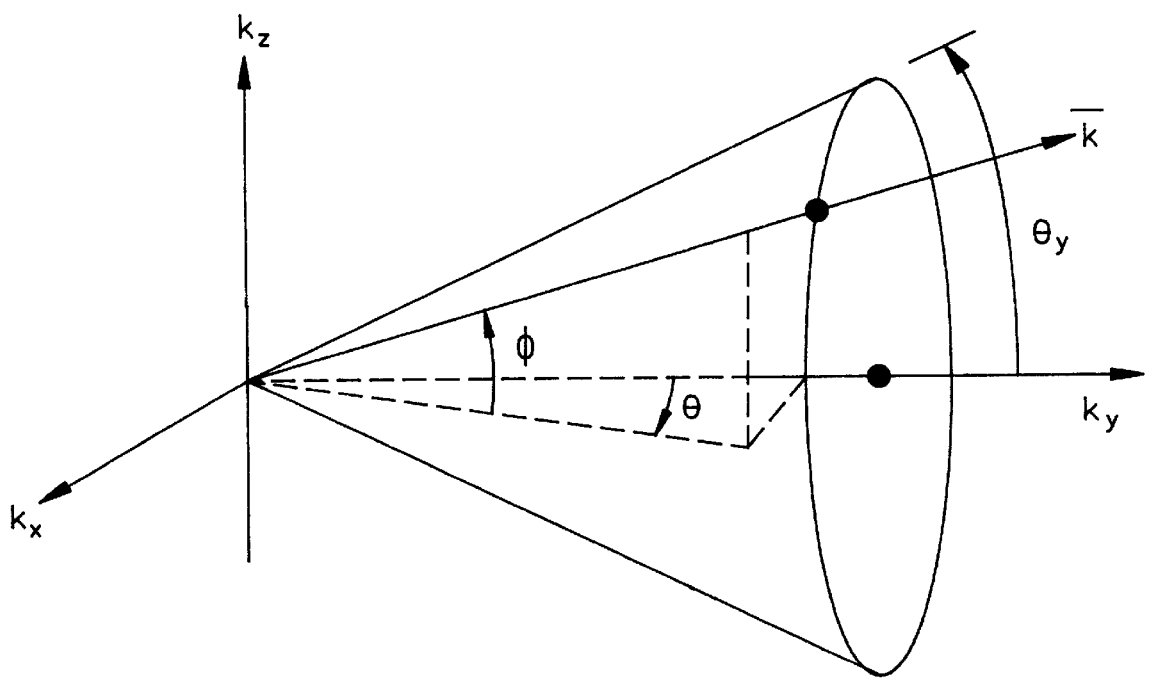
FIG. 2 shows the angular coordinates used to define the incident direction of an acoustic planewave.

Referring now to FIG. 2, there is shown the angular coordinate system adopted to describe the present invention. In FIG. 2, wavevector $\vec{k}$ with standard Cartesian components $[k_x, k_y, k_z]$ indicates the orientation of the arrival of an incident acoustic planewave. The angle between the planewave incidence arrival direction and orthogonal component $k_y$ is illustrated in FIG. 2 as conical angle $\Theta_y$. In FIG. 2, wavevector $\vec{k}$ and, thus, the arrival direction of the acoustic planewave is defined by angular coordinates $(\theta,\phi)$. Recalling the orientation shown in FIG. 1, the unit normals for components $[k_x, k_y, k_z]$ are equivalent to the unit normals $\{\vec{n}_x, \vec{n}_y, \vec{n}_z\}$ and wavevector $\vec{k}$ can be defined by:

$$k_x=\|\vec{k}\|\sin(\theta)\cos(\phi) \quad (5)$$

$$k_y=\|\vec{k}\|\cos(\theta)\cos(\phi) \quad (6)$$

and $$k_z=\|\vec{k}\|\sin(\phi) \quad (7)$$

The angle formed between wavevector $\vec{k}$ and any unit normal $\{\vec{n}_x, \vec{n}_y, \vec{n}_z\}$ can be determined via the dot product of the wavevector and the selected normal. Thus, the cosine angular dependence yields an amplitude response given by:

$$V_j(\theta,\phi) = \begin{cases} 2\cos(\Theta_j) & \text{for } -90° < \theta, \phi < 90° \text{ and } j=x,y,z \\ 0 & \text{otherwise} \end{cases} \quad (8)$$

where $$\cos(\Theta_x)=\cos(\phi)\sin(\theta),\ \cos(\Theta_y)=\cos(\phi)\sin(\theta),\ \text{and}\ \cos(\Theta_z)=\sin(\phi) \quad (9)$$

The factor of 2 in equation (8) is due to the assumption of an ideal boundary thereby doubling the signal amplitude for all angles of incidence. Given the amplitude response given by equations (8) and (9), the response of a baffled triaxial vector sensor can be expressed as:

$$\vec{v}^{(3)}(\theta,\phi,\vec{r}_o)=2\{\cos(\Theta_x)e^{ik_x x_o}\vec{n}_x+\cos(\Theta_y)e^{ik_y y_o}\vec{n}_y+\cos(\Theta_z)e^{ik_z z_o}\vec{n}_z\} \quad (10)$$

wherein the dependence on the azimuth and elevation angles explicitly indicated. Computing the element response for a triaxial vector sensor using equation (10) reveals that element response is uniform for all elevation and azimuth arrival angles. For reference, it is noted that the amplitude or angular sensitivity of a pressure sensor mounted on an ideal (perfectly rigid) baffle is given by:

$$P(\theta,\phi) = \begin{cases} 2 & \text{for } -90° < \theta, \phi < 90° \\ 0 & \text{otherwise} \end{cases} \quad (11)$$

Thus, as is apparent to those skilled in the art, in magnitude a triaxial vector sensor yields an element response equivalent to a scalar pressure sensor.

Having determined the response of a baffled triaxial vector sensor, it is possible to evaluate different approaches for beamforming an array of vector sensors. It should be noted that a single multiaxis vector sensor can be steered in the direction of an incident signal. That is, it is possible to form a broad acoustic beam, which is steered in the direction of the incident wavevector $\vec{k}$, using a single triaxial vector sensor. For a vector sensor located at the origin, the sensor response given by equation (10) can be written as:

$$\vec{v}^{(3)}(\theta,\phi,\vec{0})=2\{\cos(\Theta_x)\vec{n}_x+\cos(\Theta_y)\vec{n}_y+\cos(\Theta_z)\vec{n}_z\} \quad (12)$$

The steered sensor response for a triaxial vector sensor is obtained by taking the dot product of the normalized velocity field vector at the angle at which the element is steered $(\theta_s,\phi_s)$ and the velocity vector at arrival angle $(\theta,\phi)$ which yields:

$$g^{(3)}(\theta_s,\phi_s,\theta,\phi) = \frac{\vec{v}^{(3)}(\theta_s,\phi_s,\vec{0})\cdot\vec{v}^{(3)}(\theta,\phi,\vec{0})}{\|\vec{v}^{(3)}(\theta_s,\phi_s,\vec{0})\|\|\vec{v}^{(3)}(\theta,\phi,\vec{0})\|} \quad (13)$$

$$= \cos(\phi_s)\cos(\phi)\cos(\theta-\theta_s)+\sin(\phi_s)\sin(\phi)$$

The product $g^{(3)}(\theta_s,\phi_s,\theta,\phi)$ reaches a maximum of unity when $(\theta_s,\phi_s)=(\theta,\phi)$. Similarly, it is possible to steer a biaxial vector sensor; however, a biaxial vector sensor can only be steered in one angle. For a biaxial sensor measuring the components $v_x$ and $v_y$, the steered element response is given by:

$$g^{(2)}(\theta_s, \theta) = \cos(\theta - \theta_s) \quad (14)$$

Computing the amplitude response and the associated beam pattern (log of the squared amplitude response) reveals that the resolution of the arrival angle is limited due to the broad beam that is generated. However, assuming that the steering errors at each sensor are uncorrelated, the accuracy of the estimation of the signal arrival angle obtained from steering an individual sensor can be improved by individually steering additional sensors. This ability to steer individual sensors can be applied to a line array, such as is shown in FIG. 1, to provide resolution of both the azimuth and elevation arrival angles. Therefore, one possible array beamforming approach is to steer each vector sensor in the direction of the estimated arrival angle and beamform the resulting responses conventionally.

The process of passive sonar conventional beamforming is independent of the type of sensor used in an array. A beamformer is designed to add, in phase, the sensor outputs resulting from acoustic fields which are incident upon the array. The sensor outputs are time-delayed to synchronize the phase of acoustic signals received at each of the sensors. The time delayed signals are weighted (spatially shaded) to control the beamwidth or sidelobe levels and then summed. Thus, one possible approach to beamforming an array of vector sensors would be to delay, weight and sum the velocity components from each vector sensor separately. Assuming an array of triaxial vector sensors, $\vec{v}_n^{(3)}$, for $1 \leq n \leq N$, for the ideal baffle configuration this approach yields a summed velocity response given by:

$$\vec{v}_N^{(3)}(\theta, \phi) = 2\sin(\theta)\cos(\phi) \sum_{n=1}^{N} w_n^{(x)} e^{i(\vec{k}-\vec{k}_s)\cdot \vec{r}_n} \vec{n}_x + \quad (15)$$

$$2\cos(\theta)\cos(\phi) \sum_{n=1}^{N} w_n^{(y)} e^{i(\vec{k}-\vec{k}_s)\cdot \vec{r}_n} \vec{n}_y + 2\sin(\phi) \sum_{n=1}^{N} w_n^{(z)} e^{i(\vec{k}-\vec{k}_s)\cdot \vec{r}_n} \vec{n}_z$$

wherein the amplitude shading coefficients for each orthogonal direction, $w_n^{(x)}$, $w_n^{(y)}$, $w_n^{(z)}$ for $1 \leq n \leq N$, are arbitrary; wavevector $\vec{k}$, defined by equations (5), (6) and (7), corresponds to the arriving acoustic plane wave; and $\vec{k}_s$ is the wavevector to which the array is steered. It is noted that the exponential functions in equation (15) may be written more explicitly as:

$$e^{i(\vec{k}-\vec{k}_s)\cdot \vec{r}_n} = \exp\left[i\frac{\omega}{c}\{x_n \alpha(\theta, \phi) + y_n \beta(\theta, \phi) + z_n \gamma(\theta, \phi)\}\right] \quad (16)$$

where $$\alpha(\theta, \phi) = \cos(\phi)\sin(\theta) - \cos(\phi_s)\sin(\theta_s), \; \beta(\theta, \phi) = \cos(\phi)\cos(\theta) - \cos(\phi_s)\cos(\theta_s), \text{ and } \gamma(\theta, \phi) = \sin(\phi) - \sin(\phi_s) \quad (17)$$

One approach as a means to process the vector components, which should be avoided, is to take the norm (or length of the weighted sum of all the vector components) of $\vec{v}_N^{(3)}$ in equation (15). The norm can be written as:

$$B^{(3)}(\theta, \phi) = \sqrt{\left(\sum_{n=1}^{N} w_n^{(x)} v_{xn}\right)^2 + \left(\sum_{n=1}^{N} w_n^{(y)} v_{yn}\right)^2 + \left(\sum_{n=1}^{N} w_n^{(z)} v_{zn}\right)^2} \quad (18)$$

where $v_{xn} = V_x \exp\{i(\vec{k}-\vec{k}_s)\cdot \vec{r}\}$, $v_{yn} = V_y \exp\{i(\vec{k}-\vec{k}_s)\cdot \vec{r}\}$ and $v_{zn} = V_z \exp\{i(\vec{k}-\vec{k}_s)\cdot \vec{r}\}$. It is clear from equation (18) that this approach results in taking the square-root of the sum of the squared vector velocity components. This is a nonlinear ad hoc processing technique that should be avoided.

Another approach to array beamforming, as previously indicated, is to steer each sensor (array element) toward the source and beamform the responses of the steered vector sensors conventionally. In this approach each vector sensor in equation (15) is steered towards the source and the squared magnitude of the resulting expression is then obtained. That is, form the inner product of the summed velocities $\vec{v}_N^{(3)}$ with a steered vector of unit amplitude and take the magnitude-squared of the product. If it is assumed that the weighting of each component of every vector sensor is identical, i.e., $w_n^{(x)} = w_n^{(y)} = w_n^{(z)} = w_n$ and for line array 10 of FIG. 1, $\vec{r} = [x_n, 0, 0]$, this approach yields:

$$B^{(3)}(\theta, \phi) = \left\| \vec{v}_n^{(3)}(\theta, \phi) \cdot \vec{v}_n^{(3)}(\theta_s, \phi_s) \right\|^2 \quad (19)$$

$$= 4 g^{(3)}(\theta_s, \phi_s, \theta, \phi)^2 \left| \sum_{n=1}^{N} w_n \exp\left(i\frac{\omega}{c} x_n \alpha(\theta, \phi)\right) \right|^2$$

Similarly, for a biaxial vector sensor the approach yields:

$$B^{(2)}(\theta, \phi) = 4\{g^{(2)}(\theta_s, \theta)\cos(\phi)\}^2 \left| \sum_{n=1}^{N} w_n \exp\left(i\frac{\omega}{c} x_n \alpha(\theta, \phi)\right) \right|^2 \quad (20)$$

There is no equivalent expression for an array of uniaxis vector sensors since the elements of such an array cannot be steered in azimuth or elevation. Therefore, the beam response for an array of uniaxis vector sensors, each measuring the vector component $v_y$, would be written as:

$$B^{(1)}(\theta, \phi) = \quad (21)$$

$$\left\| \vec{v}_n^{(1)}(\theta, \phi) \right\|^2 = 4\cos^2(\theta)\cos^2(\phi) \left| \sum_{n=1}^{N} w_n \exp\left(i\frac{\omega}{c} x_n \alpha(\theta, \phi)\right) \right|^2$$

Although this approach provides a linear processing technique to beamforming, it may be limited in its capability. The restriction that weighting values be essentially the direction cosines and constant from element to element disallows emphasis of some element outputs over others and imposes the same relative weighting to the three velocity components.

A more general linear processing technique to beamforming an array of vector sensors would form the inner product of the velocity components at each element location with an arbitrary element weighting vector, $\vec{w}_n^{(3)}$. The weighting vector $\vec{w}_n^{(3)}$ may vary the weighting of each velocity component at each element. After forming the inner product, the resulting scalar field may then be delayed and summed. Thus, in general, the response is given by:

$$B^{(3)}(\theta, \phi) = \left| \sum_{n=1}^{N} \vec{w}_n^{(3)} \cdot \vec{v}_n^{(3)} e^{i(\vec{k}-\vec{k}_s)\cdot \vec{r}_n} \right|^2 \quad (22)$$

and for a line array:

$$B_L^{(3)}(\theta, \phi) = \left| \sum_{n=1}^{N} (w_n^{(x)} V_x + w_n^{(y)} V_y + w_n^{(z)} V_z) \exp\left( i\frac{\omega}{c} x_n \alpha(\theta, \phi) \right) \right|^2 \quad (23)$$

As can be seen from equations (22) and (23), the result of this approach is a linearly-weighted combination of all three measured velocity components. That is, this approach yields the square of the sum of the weighted velocity components.

A more general processing approach, likely realizable only in a free-field environment, would be to augment an array of vector sensors to include a measurement of acoustic pressure. That is, using an array in which each element within the array provides a measure acoustic pressure and the three orthogonal vector components of particle velocity. Processing all four measured quantities (pressure and three velocity components) from each element location yields:

$$B^{(pv)}(\theta, \phi) = \left| \sum_{n=1}^{N} (\vec{w}_n^{(3)} \cdot \vec{v}_n^{(3)} + w_p P_n) e^{i(\vec{k}-\vec{k}_s)\cdot \vec{r}_n} \right|^2 \quad (24)$$

As can be seen from equation (24), there are 4N degrees of freedom to manipulate in order to maximize some measure of array performance, such as signal to noise ratio. These 4N degrees of freedom are the N pressure weights $\{w_p\}$ and the N velocity weights for each orthogonal direction, $\{w_n^{(x)}\}$, $\{w_n^{(y)}\}$, $\{w_n^{(z)}\}$ for $1 \leq n \leq N$. This increased number of degrees of freedom can provide for improved performance relative to processing vector sensors alone (3N degrees of freedom). Likewise, the increased number of degrees of freedom available from processing pressure and three velocity components (as well as that from processing three velocity components) can provide for considerable improved performance relative to processing scalar pressure sensors alone.

Figure 3:
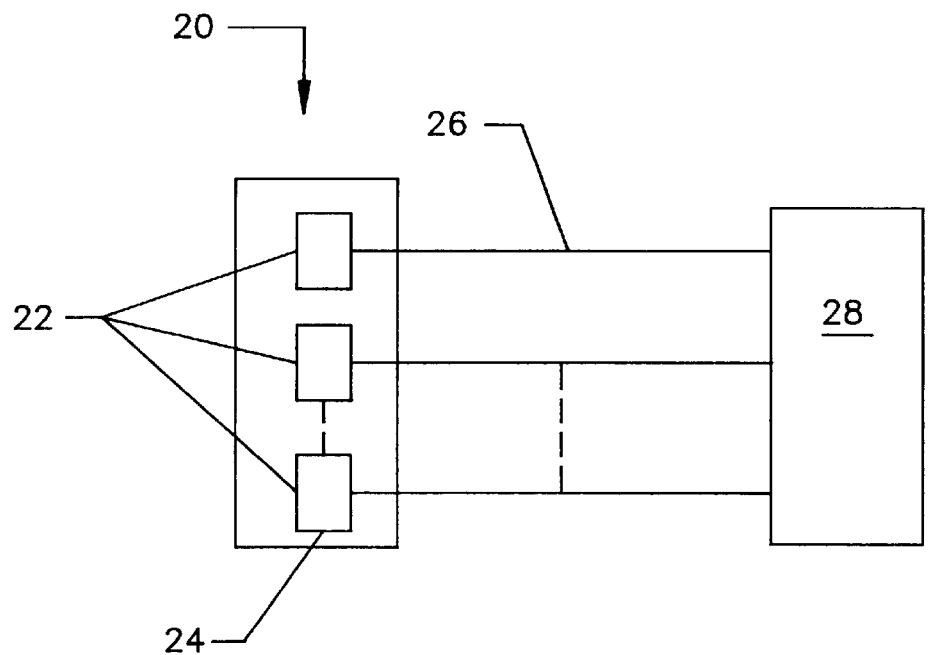
FIG. 3 is a block diagram of a sonar system in accordance with the present invention.

Referring to FIG. 3, there is shown a block diagram of an embodiment of a sonar system in accordance with the present invention. The sonar system of FIG. 3 comprises an array 20 of acoustic vector sensors 22 each which may or may not be mounted on a baffle 24. Each acoustic vector sensor 22 is responsive to acoustic signals present at the sensor and generates an electrical signal proportional to the received acoustic signal as output 26 which is coupled to beamformer 28. Beamformer 28 operates to select the output signal 26 from one or more of the sensors 22 selected as elements for a desired array configuration and generates an acoustic beam using the selected output signals.

Unlike the scalar pressure sensors used in existing submarine sonar arrays, acoustic vector sensors 22 measure the amplitude and phase of acoustic particle motion in a given direction. Vector sensors 22, generally referred to as velocity sensors, measure a vector quantity such as acoustic particle acceleration, particle velocity, or particle displacement. Although accelerometers, velocity sensors, and displacement sensors can each be used to measure acoustic particle motion, for a submarine sonar system, a velocity sensor is preferred as it provides a relatively flat signal to electronic noise ratio over the frequency range of interest.

A uniaxis acoustic vector sensor measures one Cartesian component of the acoustic field vector. Similarly, a biaxial vector sensor measures two orthogonal components of the acoustic field vector and a triaxial vector sensor measures all three orthogonal components. Array 20 can be comprised entirely of uniaxis, biaxial, or triaxial vector sensors 22 or the array can be comprised of a combination of uniaxis and multiaxis vector sensors 22. However, as presently understood, an array 20 of triaxial vector sensors 22 measuring three components of acoustic particle motion at the same relative position provides greater gains in directivity and system performance than an array of biaxial or uniaxis vector sensors.

For use as a submarine sonar system, the vector sensors 22 can be arranged in any desired configuration. In operation, vector sensors 22 measure one or more vector components of acoustic particle motion to generate a vector output signal 26 for each sensor within array 20. The output signals 26 are coupled to beamformer 28. Beamformer 28 generates steered acoustic beams using the output signal 26 from one or more of the acoustic vector sensors 22. Beamformer 28 weights the output signals 26 from the sensors by forming the inner product of the velocity components measured at each element location with an element weighting vector, $\vec{w}_n^{(3)}$. Beamformer 28 delays the resulting scalar field generated by weighting and then sums the delayed signals to generate a steered acoustic beam.

Figure 4:
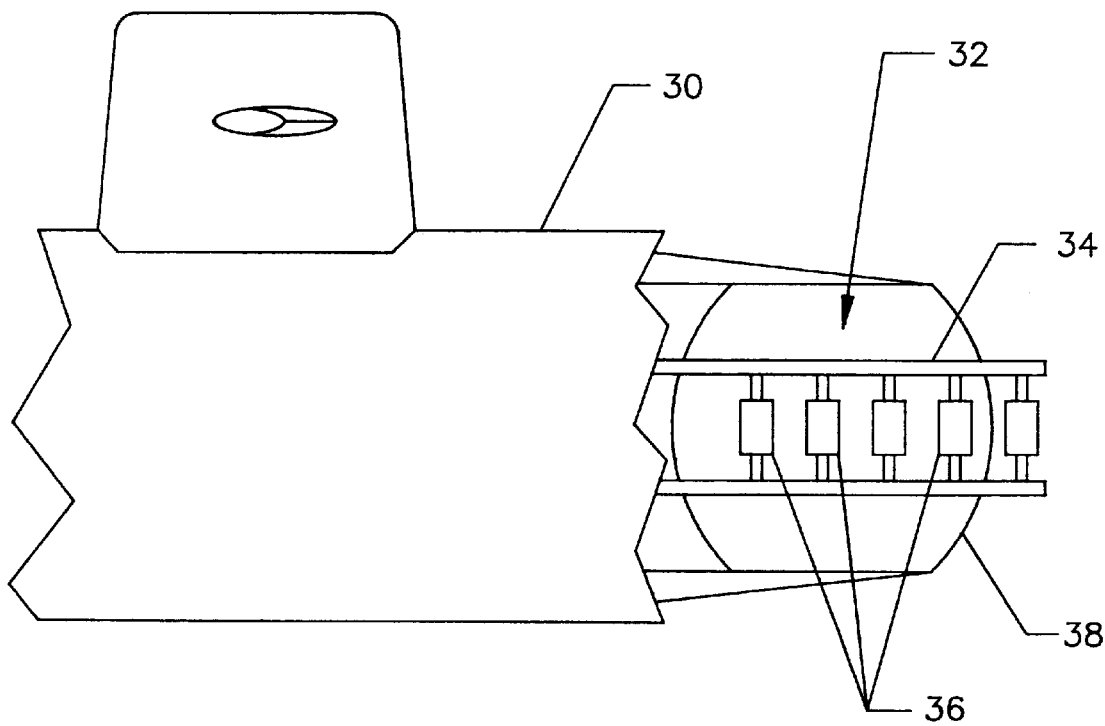
FIG. 4 is a block diagram of a submarine sonar system in accordance with the present invention.

Referring to FIG. 4, there is shown a block diagram of an embodiment of a submarine sonar system in accordance with the present invention. In FIG. 4 there is shown a cutaway view of a submarine 30 revealing bow array 32. Bow array 32, which corresponds to the bow line array of the BQQ-5 hull array or the conformal bow array of the BSY-1 system, comprises a framework 34 supporting a plurality of acoustic elements 36. Framework 34 extends around spherical sonar dome 38 of submarine 30.

Acoustic elements 36 each comprise a multiaxis vector sensor co-located with a scalar pressure sensor. That is, the elements of the array measure acoustic pressure and the three orthogonal vector components of particle velocity at the same spatial location. Acoustic elements 36 can be used in a one-for-one replacement of the individual pressure sensors in the bow line array segments of the BQQ-5 hull array or the pressure sensors in the conformal bow array of the BSY-1 system. Elements 36 can be mounted in a manner similar to that for the existing pressure sensors. However, the multiaxis vector sensors of elements 36, which measure particle motion, are sensitive to vibrations and must be mounted in a manner such that they are optimally isolated from self-noise vibration. Any vibration isolation device or method known in the art can be used to provide the desired vibration isolation when mounting sensors 36.

In operation, bow array 32 is bathed in seawater at the same pressure as the surrounding sea to minimize interference with acoustic transmission. Elements 36 measure one or more vector components of acoustic particle motion and the acoustic pressure to generate an element output signal for each element 36. The element output signals are coupled to a beamformer (not shown) located within submarine 30. The beamformer generates a weighted output for each acoustic element 36 by combining a weighted output of the scalar pressure sensor with the scalar field generated by forming the inner product of the vector components measured at each sensor location with a vector component weighting vector. The weighted output signals are delayed to synchronize the phase of the weighted output signal to that of a weighted signal at a reference array location. The resulting delayed weighted output signals are then summed.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for detecting acoustic signals comprising:

an array of acoustic elements, each acoustic element being responsive to acoustic particle motion to generate an output signal proportional to said acoustic particle motion, and each acoustic element being a multiaxis acoustic velocity sensor; and a beamformer, coupled to receive said output signal from each acoustic element within said array, for generating a steerable acoustic beam using the output signal from one or more acoustic elements selected from said array, said steerable beam $B^{(3)}(\theta,\phi)$ being given by $$B^{(3)}(\theta, \phi) = \left| \sum_{n=1}^{N} \vec{w}_n^{(3)} \cdot \vec{v}_n^{(3)} e^{i(\vec{k}-\vec{k}_s)\cdot\vec{r}_n} \right|^2$$

wherein N is the number of acoustic elements selected, $\vec{w}_n^{(3)}=[w_n^{(x)}, w_n^{(y)}, w_n^{(z)}]$ is a weighting vector, $\vec{v}_n^{(3)}$ is the output signal of the $n^{th}$ acoustic element, $\vec{k}$ is a wavevector indicating an arriving acoustic plane wave, and $\vec{k}_s$ is a wavevector to which the array is steered.

2. The system of claim 1 wherein said multiaxis acoustic velocity sensors comprise triaxial velocity sensors.

3. A system for detecting acoustic signals comprising:

an array of acoustic elements, each acoustic element being responsive to acoustic particle motion to generate an output signal proportional to said acoustic particle motion, and each acoustic element comprising a multiaxis acoustic velocity sensor and colocated with an acoustic pressure sensor; and a beamformer, coupled to receive said output signal from each acoustic element within said array, generating a steerable acoustic beam using the output signal from one or more acoustic elements selected from said array, said steerable acoustic beam $B^{(pv)}(\theta,\phi)$ being given by:

$$B^{(pv)}(\theta, \phi) = \left| \sum_{n=1}^{N} \left( \vec{w}_n^{(3)} \cdot \vec{v}_n^{(3)} + w_n^{(p)} P_n \right) e^{i(\vec{k}-\vec{k}_s)\cdot\vec{r}_n} \right|^2$$

wherein N is the number of acoustic elements selected, $\vec{w}_n^{(3)}$ is a weighting vector for the $n^{th}$ multiaxis velocity sensor, $\vec{v}_n^{(3)}$ is a response of the $n^{th}$ multiaxis velocity sensor, $w_n^{(p)}$ a pressure weight for the $n^{th}$ scalar pressure sensor, $P_n$ is a response of the $n^{th}$ scalar pressure sensor, $\vec{k}$ is a wavevector indicating an arriving acoustic plane wave; and $\vec{k}_s$ is a wavevector to which the array is steered.

* * * * *